April 21, 1970  B. WALKER  3,507,260
EXHAUST RECIRCULATION CONTROL FOR AN ENGINE
Filed May 1, 1967  2 Sheets-Sheet 1

INVENTOR
Brooks Walker

United States Patent Office 3,507,260
Patented Apr. 21, 1970

3,507,260
EXHAUST RECIRCULATION CONTROL FOR
AN ENGINE
Brooks Walker, 1280 Columbus Ave.,
San Francisco, Calif. 94133
Filed May 1, 1967, Ser. No. 635,002
Int. Cl. F02m 25/06
U.S. Cl. 123—119     3 Claims

ABSTRACT OF THE DISCLOSURE

This invention pertains to a device to control recirculation of some of the exhaust gases carbureted in a four stroke cycle internal combustion engine during some selected driving cycles but not all to reduce the nitrogen oxides in the exhaust. Nitrogen oxides are produced in the combustion chamber of an engine when the temperatures of combustion are high and the mixture is lean. They are usually lower and within the present and contemplated future limits of control when (1) The engine is idling and on very low power at lower speeds (2) At high power when the power valve enriches the mixture over the level cruise mixture as nitrogen oxides are not present in as large a percent with a rich or substantially richer than lean mixture.

---

This invention cuts out or greatly reduces the recycle of exhaust gases at idle and below a predetermined engine speed, such as 1000 r.p.m., automatically by a speed sensor if desired. The recycle is also cut out by an intake suction sensor at about or just after the power valve of the carburetor comes in, say, when the intake suction drops below 5″ suction in order not to dilute the mixture entering the cylinders at high power below 5″ as such dilution is not needed to meet the nitrogen oxides standards as contemplated for future vehicles at these power conditions and if diluted the engine maximum power will or might be diluted.

The objects of the invention are to provide exhaust recirculation to form part of the charge to the engine cylinders between a predetermined engine speed near 1000 r.p.m. and an intake suction over 5″ Hg measured relative to atmospheric (if wide open, the suction would be very low 1–2″ Hg at high speed).

Another object is to use an engine speed sensor to cut off or greatly reduce the exhaust recycle volume below a selected engine speed and allow such recycling of part of the exhaust to the intake between such speed and operating conditions with a suction higher than a selected minimum suction, such as 5″ Hg plus or minus, for optimum fuel atomization and reduced oxides of nitrogen content of the exhaust.

Another object is to provide an intake suction operated valve to control the recirculation of part of the exhaust to close off or greatly reduce the exhaust recycle at closed throttle idle and decelerations and also at operating conditions when the intake suction is less than a predetermined limit, such as 5″ Hg, or when the power valve comes in and to open the recirculation valve to varying degrees between idle and said minimum suction as when the power valve is on in which case a speed sensor valve may not be necessary.

Another object is to enclose the recycle of part of the exhaust within the intake manifold with no exterior controls of the flow of recycled exhaust.

Other features will be more particularly pointed out in the accompanying specification and claims.

These and other objects and advantages of the invention will become apparent from the following detailed description of the invention in connection with the drawings wherein.

Figure 1:
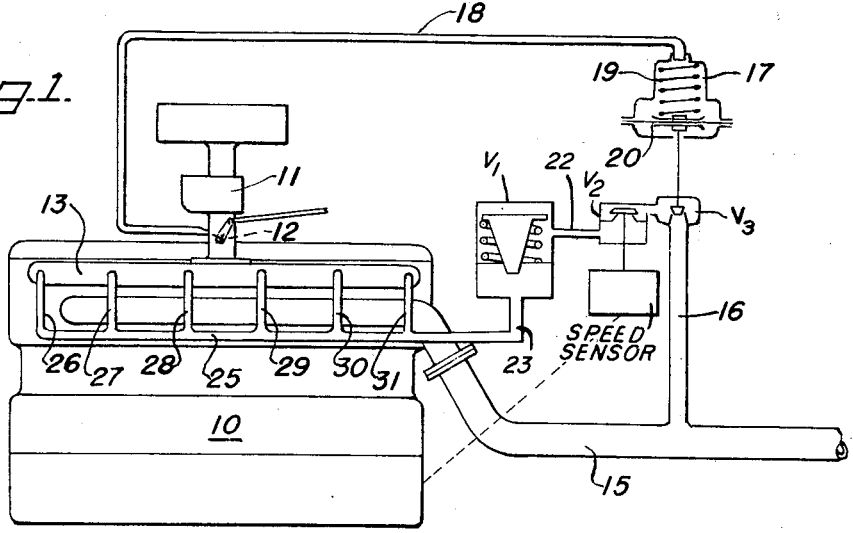
FIG. 1 is a plan view, mostly diagrammatic, showing a preferred form of the invention.

In FIG. 1 I have shown an engine 10, a carburetor 11 with a butterfly throttle 12, an intake manifold 13, an exhaust manifold, and an exhaust pipe 15.

Pipe 16 connects to valve $v3$ which is controlled by a suction actuated motor 17 with a preloaded spring 19 so that diaphragm 20 moves valve 3 to open position when the suction in the intake manifold is above a limit such as 5″ Hg and closed when the intake suction is less than about 5″ Hg as measured by a vacuum or suction gage (that is very low suction 1–2″ Hg when wide open at higher speeds). Line 18 conveys intake manifold suction from manifold 13 to valve actuating motor 17. Line 21 connects valve $v3$ to speed sensing valve $v2$ which may be actuated by the pressure from a pitot tube at the perimeter of a cooling water pump acting on one side of a diaphragm and the pressure from the intake to said water pump acting on the other side of the diaphragm to neutralize the effect of the radiator pressure cap, all as explained in U.S. Patent No. 3,204,620, issued Sept. 7, 1965, entitled "Speed Sensing Device," to Brooks Walker, the inventor in the case.

This valve $v2$ is closed below a predetermined engine speed, such as 1000 r.p.m. plus or minus. Line 22 connects speed sensing valve $v2$ to valve $v1$ which may be a variable orifice valve actuated by intake suction to give a larger opening to exhaust flow at low intake manifold suction than at high intake suction if such a control is desired.

Line 23 can lead directly to the engine side of the carburetor 11 or to a manifold 25 from which tubes 26, 27, 28, 29, 30 and 31 lead to a point near each intake valve, as is shown for a 6-cylinder engine 10 in FIG. 1, for better distribution of the recycled exhaust.

In operation at speeds below a selected speed, such as 1000 r.p.m., the exhaust recycle through lines 16, valve $v3$, line 21, valve $v2$, line 22, valve $v1$ and line 23 will be shut off or greatly restricted by speed sensor valve $v2$. At speeds about 1000 r.p.m. and operating conditions with suction in intake manifold 13 higher than the selected suction for valve $v3$, valve $v3$ will be open as are valves $v2$ and $v1$ so that exhaust will flow to intake 13 until the throttle 12 is opened and the engine speed is such that the intake suction falls below the selected suction of actuation of valve $v3$. Valve $v3$ will then close to shut off exhaust flow or greatly restrict such flow for maximum engine power at wide open throttle operations. The volume of flow may be controlled further by a flow control valve $v1$ somewhat similar to a crankcase ventilator valve such as disclosed in U.S. Patent 3,105,477.

If distribution of exhaust gases to each cylinder is desired, a manifold 25 and extension tubes 26, 27, 28, 29, 30 and 31 may be used.

Figure 2:
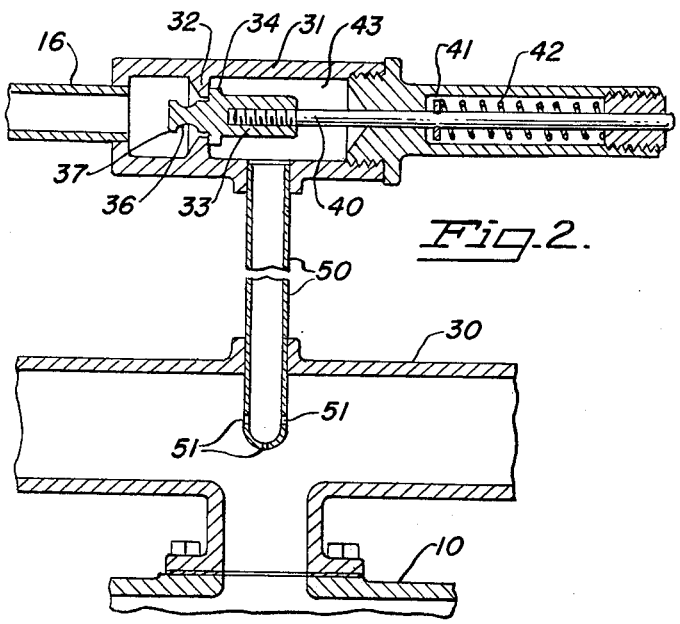
FIG. 2 is an elevation view, mostly diagrammatic, of another form of the invention and the exhaust recycle system.

In FIG. 2 I have shown an engine 10 having an intake manifold 30′. A tube or pipe 16 leads from the exhaust manifold or pipe 15 to valve assembly 31′ which includes a seat and restrictor section 32. Movable valve 33 is urged to the left, as viewed in FIG. 2, so that seat 34 abuts against restriction section 32 by spring 42 and collar 41 on stem 40 so that no exhaust gas flows from pipe 16 to pipe 50 and ports 51 to intake manifold 30 when the suction in intake manifold 30, pipe 50 and area 43 of valve assembly 31 is less than a predetermined amount such as 5″ Hg or such suction as opens the power valve in the carburetor which supplies fuel to this engine 10. As the suction in manifold 30 increases with the closing of the throttle from the selected 5″ Hg suction operation, valve 33 will be sucked part way open to where reduced area 36 will allow the desired amount of exhaust recirculation to give the desired oxides of nitrogen control and maintain proper engine performance. The contour of restricted area 36 can be tailored to meet the California or U.S. emission standards of oxides of nitrogen. As the engine approaches the closed throttle idle or deceleration operation, suction on valve 33 will cause valve 33 to move to the right, as viewed in FIG. 2, until section 37 comes under the opening in section 32 of valve 31. In this position of valve 33 the flow of exhaust gas from valve tube 16 to tube 50 and intake manifold 30 will be greatly restricted or substantially cut off.

Figure 3:
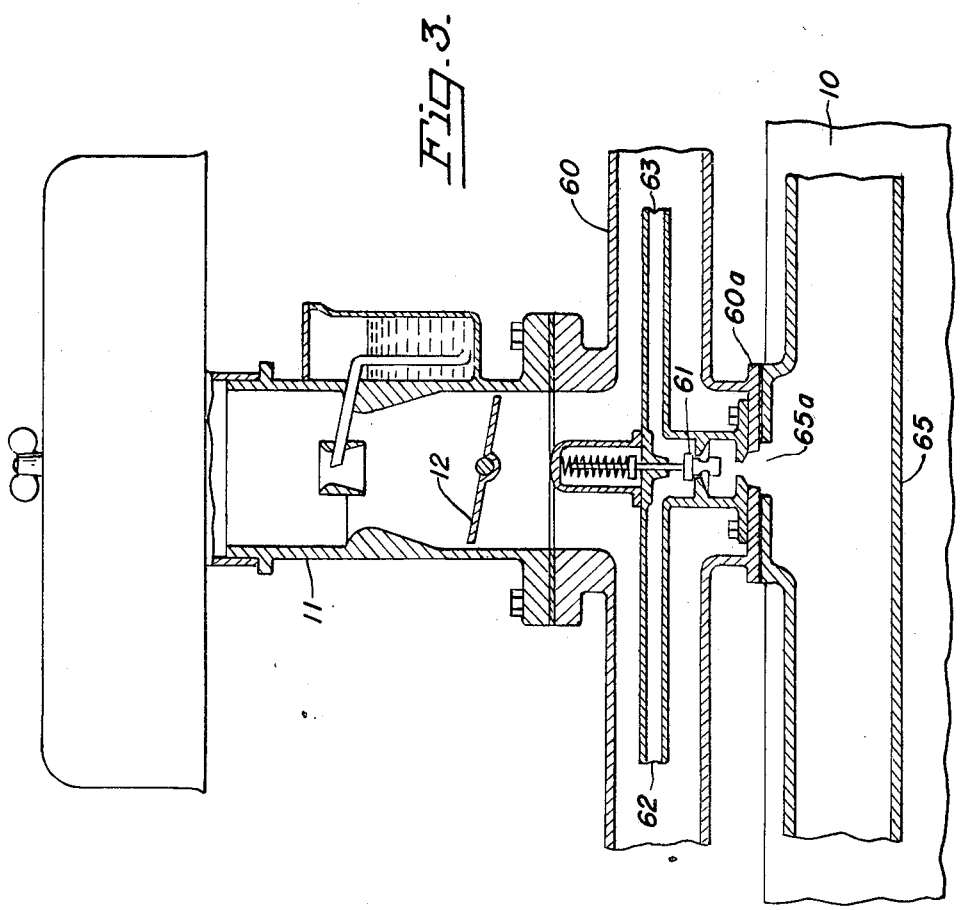
FIG. 3 is a side elevation, partly cut away, showing another form of the invention and recycle system.

In FIG. 3 I have shown an engine 10, an intake manifold 60, an exhaust manifold 65.

A valve assembly 61 is secured to manifold 60 at heat riser section 60a and receives exhaust gases through port 65a of exhaust manifold 65. Valve assembly 61 is similar to valve 31 of FIG. 2 and operates in the same manner except that it is all enclosed in intake manifold 60 and requires no controls exterior of manifold 60. Tubes 62 and 63 lead to the appropriate locations in the intake manifold for proper distribution of the hot exhaust gas when recirculating.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim as my invention:

1. An exhaust recirculation control for an internal combustion engine having an exhaust conduit for conducting exhaust gases from the engine and an inlet conduit for conducting a combustible fluid to the engine comprising, a connecting conduit connecting the exhaust conduit to the inlet conduit and valve means for controlling the flow of exhaust gases through said connecting conduit, said valve means comprising a valve for minimizing the flow of exhaust gas at speeds below a selected minimum speed of rotation of the engine and a valve for minimizing the flow of exhaust gas at a preselected suction pressure in the inlet conduit.

2. A control apparatus as defined in claim 1 further including a valve for permitting a maximum flow of exhaust gas at low intake suction pressure in the intake conduit and a reduced flow at a higher intake suction pressure in said intake conduit.

3. An exhaust recirculation control for an internal combustion engine having an exhaust conduit and an inlet conduit for conducting a combustible fluid to the engine comprising, a connecting conduit connecting the exhaust conduit to the inlet conduit and valve means for controlling the flow of exhaust gases through said connecting conduit, said valve means comprising a valve for minimizing the flow at pressures above a first preselected suction and below a second preselected suction in said inlet conduit and for regulating the flow in amounts greater than said minimized flows with the suction pressure in a zone between said preselected suction pressures.

References Cited

UNITED STATES PATENTS

| | | | |
|---|---|---|---|
| 2,154,417 | 4/1939 | Anderson | 123—119 |
| 2,419,747 | 4/1947 | Wassman | 123—119 |

WENDELL E. BURNS, Primary Examiner